US007020363B2

(12) United States Patent
Johannessen

(10) Patent No.: US 7,020,363 B2
(45) Date of Patent: Mar. 28, 2006

(54) OPTICAL PROBE FOR WAFER TESTING

(75) Inventor: Kjetil Johannessen, Trondheim (NO)

(73) Assignee: Intel Corporation, Santa Clara, CA (US)

( * ) Notice: Subject to any disclaimer, the term of this patent is extended or adjusted under 35 U.S.C. 154(b) by 320 days.

(21) Appl. No.: 10/040,398

(22) Filed: Dec. 28, 2001

(65) Prior Publication Data

US 2003/0123793 A1 Jul. 3, 2003

(51) Int. Cl.

| | |
|---|---|
| ***G02B 6/34*** | (2006.01) |
| ***G02B 6/26*** | (2006.01) |
| ***G02B 6/30*** | (2006.01) |
| ***G02B 6/10*** | (2006.01) |

(52) U.S. Cl. ........................... 385/36; 385/35; 385/50; 385/129; 385/141; 362/511

(58) Field of Classification Search ............ 385/49–50, 385/129, 33–36; 362/31, 511
See application file for complete search history.

(56) References Cited

U.S. PATENT DOCUMENTS

| | | | | |
|---|---|---|---|---|
| 6,687,010 | B1 * | 2/2004 | Horii et al. | 356/479 |
| 2003/0123793 | A1 * | 7/2003 | Johannessen | 385/36 |

* cited by examiner

*Primary Examiner*—Frank G. Font
*Assistant Examiner*—Michael P. Mooney
(74) *Attorney, Agent, or Firm*—Blakely, Sokoloff, Taylor & Zafman LLP

(57) ABSTRACT

A first optical probe is used to test a planar lightwave circuit. In one embodiment, a second probe is used in combination with the first probe to test the planar lightwave circuit by sending and receiving a light beam through the planar lightwave circuit.

15 Claims, 5 Drawing Sheets

OPTICAL PROBE FOR WAFER TESTING

BACKGROUND OF THE INVENTION

1. Field of the Invention

The described invention relates to the field of optical circuits. In particular, the invention relates to an optical probe for testing an optical circuit.

2. Description of Related Art

Optical circuits include, but are not limited to, light sources, detectors and/or waveguides that provide such functions as splitting, coupling, combining, multiplexing, demultiplexing, and switching. Planar lightwave circuits (PLCs) are optical circuits that are manufactured and operate in the plane of a wafer. PLC technology is advantageous because it can be used to form many different types of optical devices, such as array waveguide grating (AWG) filters, optical add/drop (de)multiplexers, optical switches, monolithic, as well as hybrid opto-electronic integrated devices. Such devices formed with optical fibers would typically be much larger or would not be feasible at all. Further, PLC structures may be mass produced on a silicon wafer.

FIG. 1 is a schematic diagram that shows an example of the current way that planar waveguides 20, 22 are tested. Typically, a PLC wafer is diced and optical fibers, 10, 12 are mounted to the edge of a PLC die. Light is sent into the PLC structure 5 by light source, such as a laser, coupled to a first optical fiber 10, and a photodetector coupled to a second optical fiber 12 detects the power of light transmitted to it. A photodetector coupled to the second optical probe 12 will detect the power of light transmitted to it.

If the PLC works properly, then optical fibers are permanently attached to the PLC, and the PLC is put into a package. However, if the PLC does not work properly, the unit is discarded, and the time and effort to dice, fiber mount and to comprehensively test the device are wasted. Thus, a method of testing a planar lightwave circuit at the wafer level or before fiber attach is important.

DETAILED DESCRIPTION

A method of testing a planar lightwave circuit is achieved by positioning an optical probe in a probe region over a waveguide. In one embodiment, the probe region comprises a waveguide core layer that has either no upper cladding deposited yet, or has a very thin layer of upper cladding deposited. In another embodiment, the probe region has had its upper cladding at least partially removed, e.g., by etching. The remaining upper cladding may be approximately 2 microns or less. In some cases part of the waveguide's core layer may also be removed. A second probe may be used in combination with the first probe to test the planar lightwave circuit by sending and receiving a light beam through the planar lightwave circuit.

Figure 1:
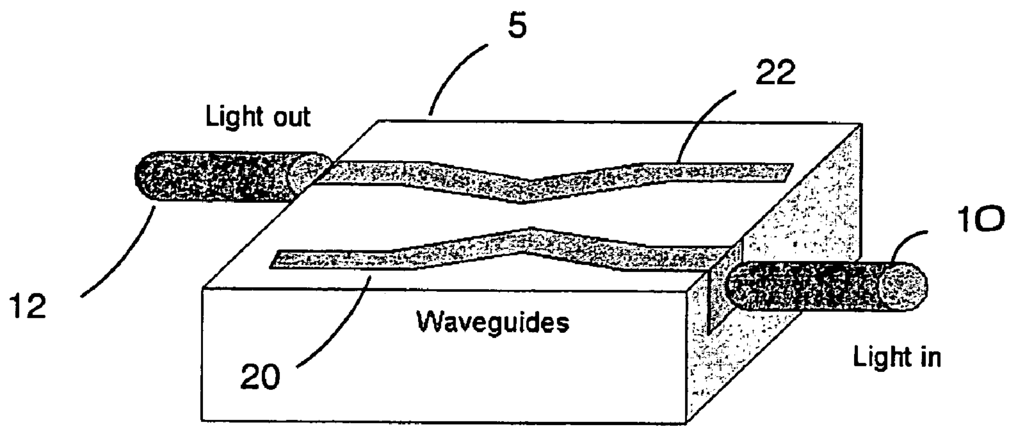
FIG. 1 is a schematic diagram that shows an example of the current way that planar waveguides are tested.
Figure 2:
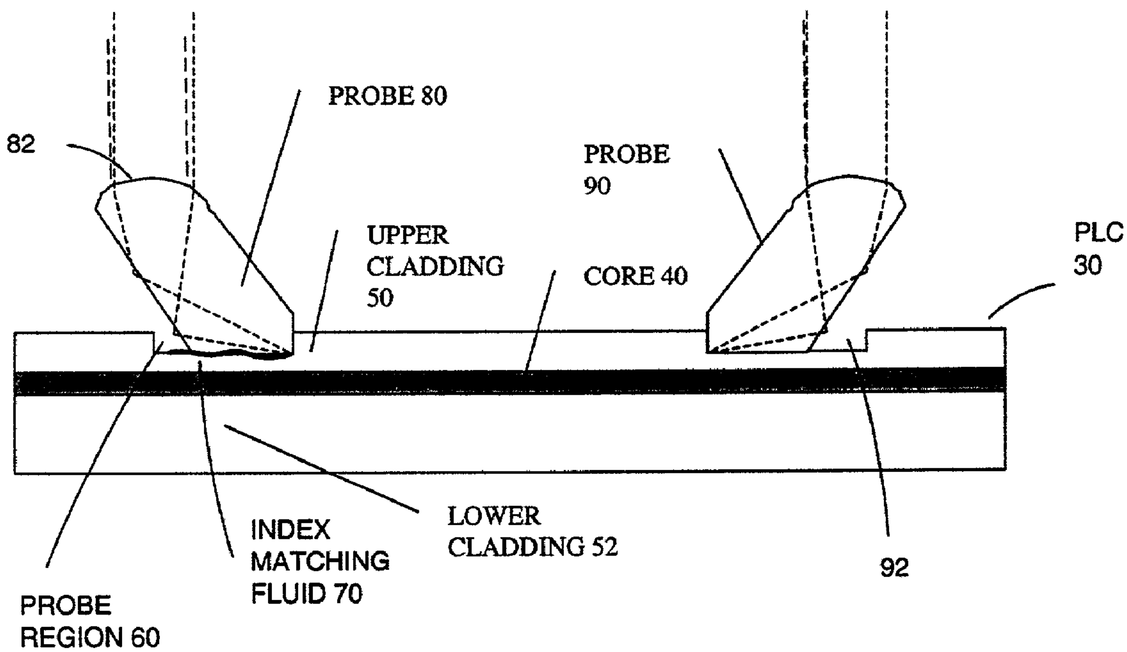
FIG. 2 is a cross-sectional schematic diagram of an optical probe used to test a planar lightwave circuit (PLC).

FIG. 2 is a cross-sectional schematic diagram of an optical probe used to test a planar lightwave circuit (PLC) 30. The PLC 30 comprises a waveguide having a core layer 40 and lower cladding 52.

An optical probe 80 is coupled to the PLC 30 in a probe region 60 having either a thin layer of upper cladding 50 or no upper cladding over the waveguide core. In one embodiment, the probe region 60 may include approximately 1–2 microns of upper cladding 50 over the waveguide core 40. However, if reducing optical loss is important, a thicker upper cladding 50 may be employed.

In one embodiment, the optical probe 80 is a prism having a rounded top 82 that serves as a lens to direct light incident upon the optical probe's upper surface to be focused toward the bottom portion of the optical probe 80. The probe's upper surface may be either the complete focusing optics or a part of the focusing optics used to couple light between the probe and light source and/or detector. Preferably the optical probe 80 is made of a material harder than that of which it will probe, so that the optical probe will not be scratched during its usage, and can be re-used on other PLCs.

The optical probe has a slightly higher index of refraction than the waveguide for which it will probe. For example, a high density glass or sapphire may be used to probe a silica waveguide, and lithium niobate ($LiNbO_3$) or rutile may be suitable for probing a silicon nitride waveguide. The angle of the probe 30 and the probe's index of refraction are selected to match the guided mode of the waveguide of the PLC 30. Different probes may be used for different waveguides.

In one embodiment, a second optical probe 90 is coupled to a second probe region 92. The second optical probe 90 may be used in combination with the first optical probe 80 to test a waveguide in the PLC 30. In one embodiment, a light source is coupled to the first optical probe 80, and a photodetector is coupled to the second optical probe 90. If the waveguide is working properly the detector will detect light being emitted through the PLC 30. An optical index-matching fluid 70 may optionally be used in the interface between the PLC and the optical probes 80, 90 to improve optical coupling.

Figure 3:
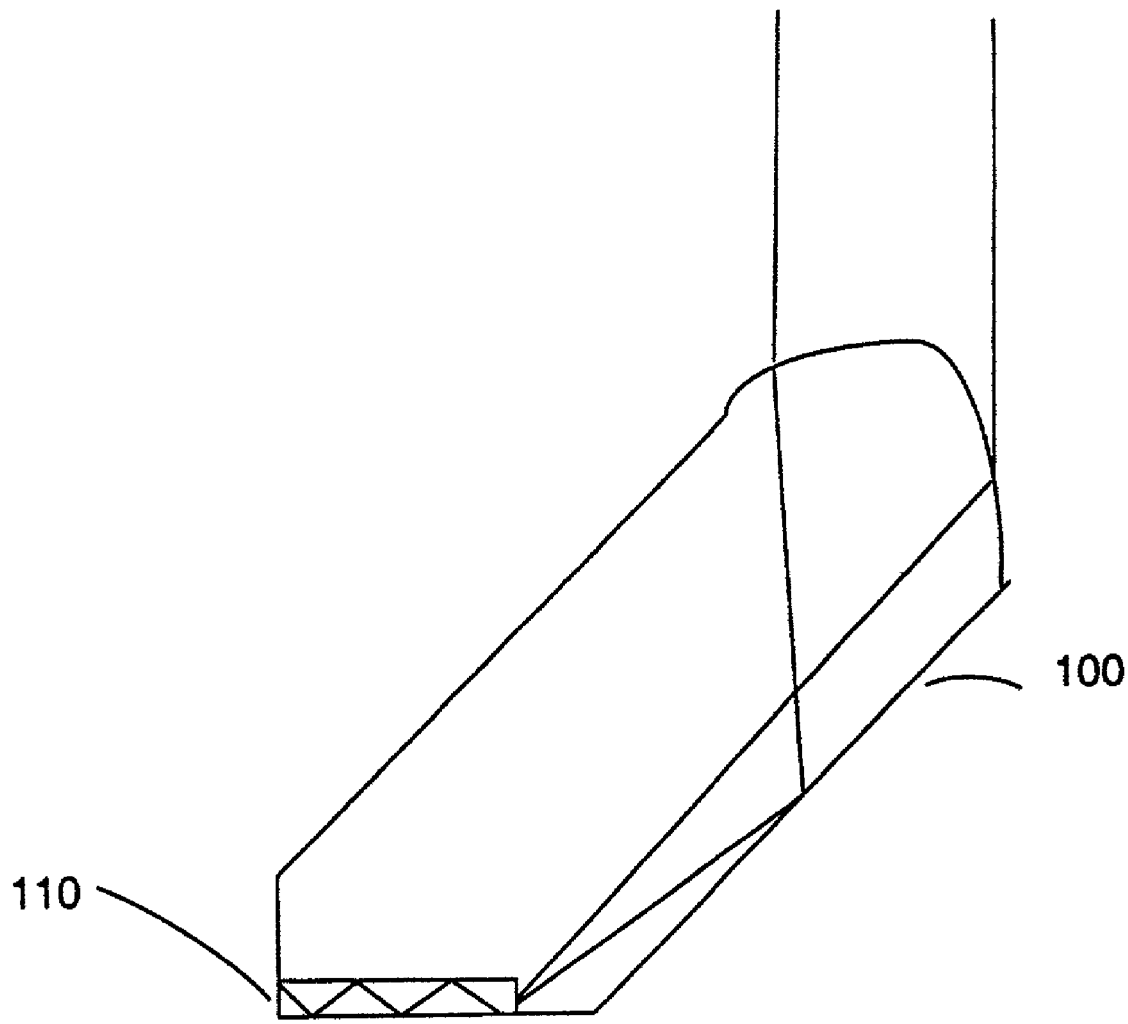
FIG. 3 is schematic diagram of one embodiment of a prism having a bottom portion that includes a waveguide.

FIG. 3 is schematic diagram of one embodiment of a prism 100 having a bottom portion that includes an integrated waveguide 110. The waveguide 110 may be diffused into the prism from the bottom, created by ion exchange or ion implantation, or may be deposited, e.g., by applying a chemical vapor deposition (CVD) technique. In one embodiment, the integrated waveguide 110 has a slightly higher refractive index than the rest of the probe, and is not uniform over the entire bottom portion of the prism 100. Instead, the waveguide 110 has either an abrupt end, a graded end such as that of a diffused waveguide, or the waveguide 110 may have a grating. The waveguide 110 should have a slightly higher index of refraction than the waveguide for which it will probe, and the waveguide 110 should facilitate a phase velocity that closely matches that of the PLC waveguide. The closeness of the match depends on the remaining thickness of the upper cladding; the smaller the upper cladding thickness, the less accurate a match is needed. The integrated waveguide 110 allows for better coupling of the guided mode of the prism with that of the waveguide of the PLC.

Figure 4:
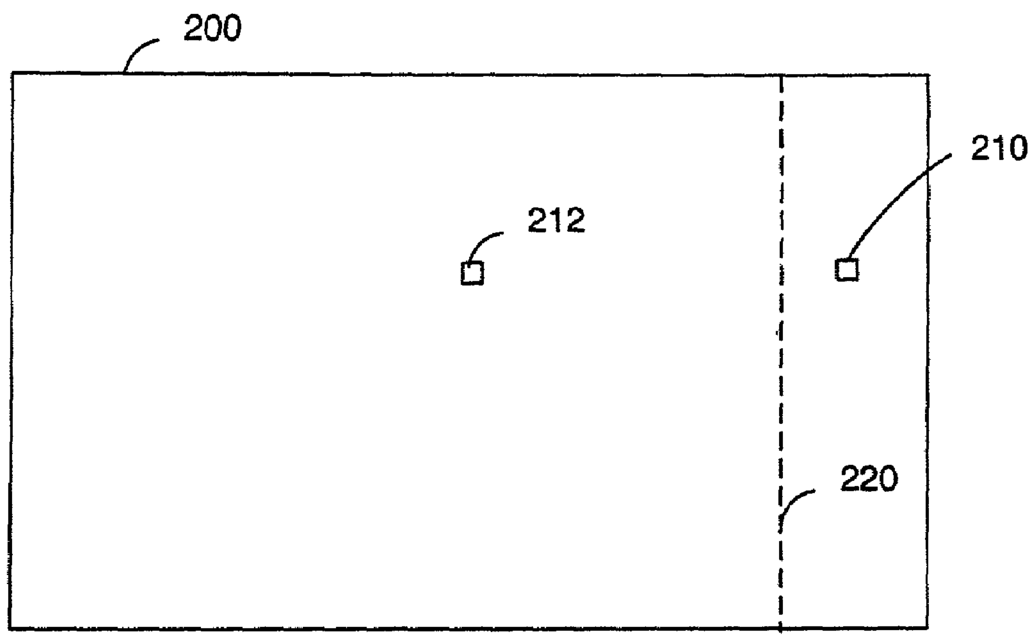
FIG. 4 is a schematic diagram that shows an example of a PLC die having a first probe region and a second probe region.

FIG. 4 is a schematic diagram that shows an example of a PLC die 200 having a first probe region 210 and a second probe region 212. After testing is complete, the optical probes are removed from the PLC die 200. In one embodiment, one or more of the probe regions, such as probe region 210, are removed from the PLC die 200 by slicing the die, e.g., along line 220. In another embodiment, the probe regions are not removed; however, they may be filled with optical index-matching fluid to reduce optical losses in the PLC.

Figure 5:
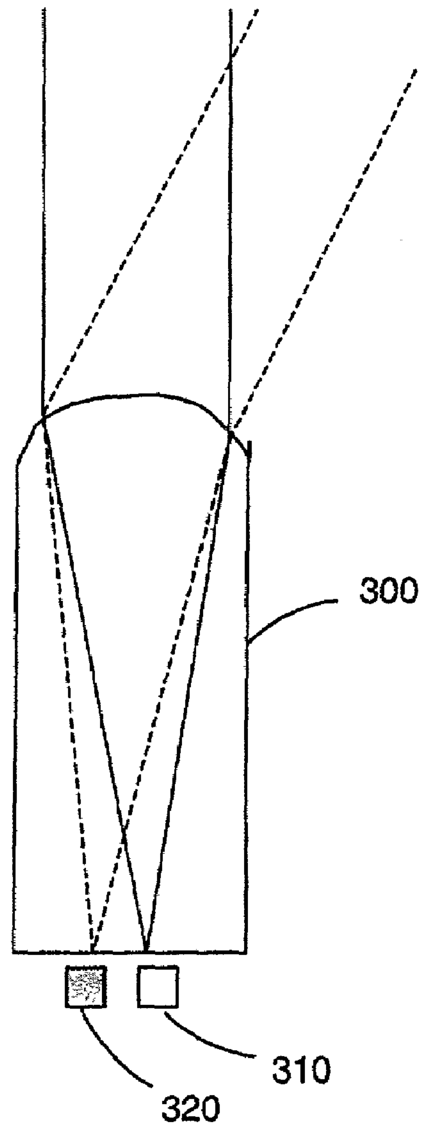
FIG. 5 is a schematic diagram that shows a cross-section view of an optical probe coupled to waveguides taken along their direction of propagation in the PLC.

FIG. 5 is a schematic diagram that shows a cross-section view of an optical probe 300 coupled to waveguides 310, 320 taken along their direction of propagation in the PLC. FIG. 5 illustrates that an optical probe 300 can be coupled to more than one waveguide without moving the optical probe. If a light source is coupled to the optical probe, then the light can be directed to either of the waveguides 310, 320 depending on the angle of incidence of the light into the optical probe. Alternatively, if a photodetector is coupled to the optical probe, then depending on the angle of the photodetector to the optical probe, light can be detected from either of the waveguides 310, 320.

Multiple waveguides may be integrated into the optical probe similar to the integrated waveguide 110 of FIG. 2 to improve coupling to the waveguides 310, 320.

A segmented optical probe, i.e., a probe having a top surface with several focuses, may be used. This allows coupling to multiple waveguides at the same time. The optical probe may also comprise a microlens array.

In addition to the testing methods previously mentioned, this technology can be used for fault isolation or intermediate device debugging capabilities. It can be applied to a whole wafer as well as previously diced and possibly fiber interfaced PLCs if they are found non-optimal in performance. One or more probes with detection and/or transmission capability may be coupled at intermediate positions within the PLC (which would be inaccessible by conventional methods) to measure characteristics of PLC subunits and hence determine the local cause of observed effects for debug, fault isolation, and performance enhancement purposes. In one embodiment, the optical probes may be used with a moderately thick upper cladding. In this case, once the optical probe is removed, the transmission in the PLC is normal, and no loss is due to the temporary placement of the optical probe from testing.

Thus, a method and apparatus for testing a planar lightwave circuit using an optical probe is disclosed. However, the specific embodiments and methods described herein are merely illustrative. Numerous modifications in form and detail may be made without departing from the scope of the invention as claimed below. The invention is limited only by the scope of the appended claims.

What is claimed is:

1. An optical probe comprising:

a prism having a rounded top; and a first waveguide in or on a bottom portion of the prism, the rounded top to focus light entering the prism into the first waveguide, wherein the first waveguide comprises an integrated waveguide.

2. The optical probe of claim 1, wherein the light entering the rounded top is capable of being redirected approximately 90 degrees by the prism and the first waveguide.

3. An optical probe comprising:

a prism having a rounded top;

a first waveguide in or on a bottom portion of the prism, the rounded top to focus light entering the prism into the first waveguide; and a second waveguide in or on the bottom portion of the prism, wherein the rounded top constitutes more than one focus to couple light into the first waveguide and the second waveguide.

4. An optical probe comprising:

a prism having a rounded top; and a first waveguide in or on a bottom portion of the prism, the rounded top to focus light entering the prism into the first waveguide, wherein the rounded top comprises a microlens array.

5. A method of making an optical probe, the method comprising:

forming a lens surface on a prism; and forming a waveguide in or on a bottom portion of the prism.

6. The method of claim 5, wherein the waveguide is formed by diffusion or ion exchange.

7. The method of claim 5, wherein the waveguide is formed by ion implantation.

8. The method of claim 5, wherein the waveguide is formed by deposition.

9. The method of claim 5, further comprising:

forming a second waveguide in or on the bottom portion of the prism.

10. The method of claim 5, wherein forming the lens surface on the prism further comprises forming a lens surface having more than one focus.

11. The method of claim 5, wherein forming the lens surface on the prism further comprises forming a lens surface having a microlens array.

12. An optical probe comprising:

a prism having a rounded top; and a first waveguide in or on a bottom portion of the prism, the rounded top to focus light entering the prism into the first waveguide, wherein the first waveguide has an end selected from an abrupt end and a graded end.

13. The optical probe of claim 12, wherein the prism is at least partially made of sapphire, high density glass, $LiNbO_3$, or rutile.

14. An optical probe comprising:

a prism having a rounded top; and a first waveguide in or on a bottom portion of the prism, the rounded top to focus light entering the prism into the first waveguide, wherein the first waveguide has a higher index of refraction than the prism.

15. The method of claim 5, wherein the waveguide is formed within the prism.

* * * * *